(12) United States Patent
Higgins et al.

(10) Patent No.: US 11,811,774 B1
(45) Date of Patent: *Nov. 7, 2023

(54) SYSTEM AND METHOD FOR RECURSIVE PROPAGATING APPLICATION ACCESS CONTROL

(71) Applicant: Google LLC, Mountain View, CA (US)

(72) Inventors: Patrick Allen Higgins, Broomfield, CO (US); Justin Lee Hicks, Boulder, CO (US); Thomas Palmer Buzbee, Boulder, CO (US); Michael Jeffrey Procopio, Boulder, CO (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/572,598

(22) Filed: Jan. 10, 2022

Related U.S. Application Data

(63) Continuation of application No. 16/398,198, filed on Apr. 29, 2019, now Pat. No. 11,223,624, which is a
(Continued)

(51) Int. Cl.
*H04L 9/40* (2022.01)
*G06F 21/62* (2013.01)

(52) U.S. Cl.
CPC ........ *H04L 63/101* (2013.01); *G06F 21/6218* (2013.01)

(58) Field of Classification Search
CPC .......................... H04L 63/101; G06F 21/6218
See application file for complete search history.

(56) References Cited

U.S. PATENT DOCUMENTS 5,729,734 A 3/1998 Parker et al.
5,930,801 A 7/1999 Falkenhainer et al.
(Continued)

FOREIGN PATENT DOCUMENTS

CN 102882985 A * 1/2013
CN 103685340 A * 3/2014
(Continued)

OTHER PUBLICATIONS

Yen-Hung Kuo, A Hybrid Cloud Storage Architecture for Service Operational High Availability, Published in: 2013 IEEE 37th Annual Computer Software and Applications Conference Workshops, Date of Conference: Jul. 22-26, 2013, 6 pages (Year: 2013).*
(Continued)

*Primary Examiner* — Shahriar Zarrineh
(74) *Attorney, Agent, or Firm* — Lowenstein Sandler LLP

(57) ABSTRACT

A method includes receiving, at a cloud storage system, a request to access a file from an external application on behalf of a first user account, determining, based on one or more access control lists (ACLs) associated with a shared folder, that the external application is not allowed to access the file on behalf of the first user account, and receiving, from a user device associated with the first user account, a message authorizing the external application to access the file on behalf of the first user account. The method further includes modifying the ACLs associated with the shared folder containing the file and a subfolder, and allowing the external application to access the file on behalf of the first user account based on the user information of the first user account and the application information of the external application in the modified ACLs.

20 Claims, 10 Drawing Sheets

Related U.S. Application Data continuation of application No. 14/709,179, filed on May 11, 2015, now Pat. No. 10,277,601.

(56) References Cited

U.S. PATENT DOCUMENTS

| | | | |
|---|---|---|---|
| 5,956,715 A | 9/1999 | Glasser et al. | |
| 6,061,684 A * | 5/2000 | Glasser | G06F 21/6218 |
| | | | 707/999.009 |
| 6,516,315 B1 | 2/2003 | Gupta | |
| 6,625,603 B1 * | 9/2003 | Garg | G06F 9/468 |
| | | | 707/999.009 |
| 7,136,903 B1 * | 11/2006 | Phillips | G06F 16/95 |
| | | | 380/30 |
| 7,197,638 B1 | 3/2007 | Grawrock et al. | |
| 7,367,044 B2 | 4/2008 | Fowler et al. | |
| 7,797,336 B2 | 9/2010 | Blair et al. | |
| 8,135,633 B1 * | 3/2012 | LeBaron | G06Q 40/12 |
| | | | 705/30 |
| 8,140,576 B1 * | 3/2012 | Viripaeff | G06F 21/31 |
| | | | 707/783 |
| 8,224,776 B1 | 7/2012 | Anderson et al. | |
| 8,301,900 B1 | 10/2012 | Juang | |
| 8,438,612 B2 * | 5/2013 | Faitelson | G06F 16/156 |
| | | | 726/2 |
| 8,572,033 B2 | 10/2013 | Shukla | |
| 8,578,478 B2 * | 11/2013 | Beck | G06F 11/3006 |
| | | | 726/21 |
| 8,655,053 B1 * | 2/2014 | Hansen | G06Q 10/10 |
| | | | 382/154 |
| 8,782,136 B1 * | 7/2014 | Ho | H04L 67/10 |
| | | | 709/204 |
| 8,812,625 B1 | 8/2014 | Chitilian et al. | |
| 8,838,538 B1 | 9/2014 | Landau et al. | |
| 8,856,176 B1 | 10/2014 | Venu et al. | |
| 8,977,661 B2 * | 3/2015 | Cidon | G06F 16/10 |
| | | | 707/827 |
| 9,021,045 B2 | 4/2015 | Pennington | |
| 9,176,720 B1 | 11/2015 | Day-Richter et al. | |
| 9,378,389 B2 | 6/2016 | Kantor et al. | |
| 9,396,208 B2 | 7/2016 | Fukui et al. | |
| 9,426,216 B2 | 8/2016 | Subramani et al. | |
| 9,430,937 B2 | 8/2016 | Lu | |
| 9,507,791 B2 | 11/2016 | Gunn | |
| 9,516,028 B1 | 12/2016 | Andruschuk et al. | |
| 9,552,368 B1 * | 1/2017 | Clark | G06F 16/182 |
| 9,639,711 B2 * | 5/2017 | Sturonas | G06F 21/6218 |
| 9,652,460 B1 | 5/2017 | Barisic et al. | |
| 9,679,148 B2 * | 6/2017 | Faitelson | G06F 16/176 |
| 9,697,373 B2 | 7/2017 | Nelson et al. | |
| 9,792,452 B2 * | 10/2017 | Tan | G06F 21/62 |
| 9,934,241 B2 | 4/2018 | Duval et al. | |
| 10,042,013 B2 | 8/2018 | Lips et al. | |
| 10,152,530 B1 | 12/2018 | Hart et al. | |
| 10,257,291 B1 | 4/2019 | Matiash et al. | |
| 2002/0055946 A1 | 5/2002 | Prager et al. | |
| 2002/0124053 A1 * | 9/2002 | Adams | G06F 9/468 |
| | | | 709/219 |
| 2002/0169781 A1 | 11/2002 | Poole et al. | |
| 2003/0131073 A1 | 7/2003 | Lucovsky et al. | |
| 2004/0139396 A1 | 7/2004 | Gelernter et al. | |
| 2004/0193673 A1 | 9/2004 | Samji et al. | |
| 2004/0254884 A1 | 12/2004 | Haber et al. | |
| 2005/0149549 A1 | 7/2005 | Jaspers et al. | |
| 2006/0074837 A1 | 4/2006 | Braddy et al. | |
| 2006/0167940 A1 | 7/2006 | Colton et al. | |
| 2007/0143085 A1 * | 6/2007 | Kimmel | G16H 40/20 |
| | | | 703/3 |
| 2007/0143292 A1 | 6/2007 | Nozaki et al. | |
| 2007/0179814 A1 | 8/2007 | Hernandez et al. | |
| 2007/0233647 A1 | 10/2007 | Rawat et al. | |
| 2007/0245018 A1 | 10/2007 | Bhola et al. | |
| 2007/0255760 A1 | 11/2007 | Itoh et al. | |
| 2008/0005120 A1 | 1/2008 | Li | |
| 2008/0091747 A1 | 4/2008 | Prahlad et al. | |
| 2008/0136938 A1 | 6/2008 | Ohmura et al. | |
| 2008/0155652 A1 | 6/2008 | DeBie | |
| 2008/0222108 A1 | 9/2008 | Prahlad et al. | |
| 2008/0263045 A1 | 10/2008 | Soto et al. | |
| 2009/0024931 A1 | 1/2009 | Bae | |
| 2009/0089413 A1 * | 4/2009 | Kamei | H04L 61/457 |
| | | | 709/223 |
| 2009/0132285 A1 | 5/2009 | Jakobovits | |
| 2009/0158391 A1 | 6/2009 | Bhogal et al. | |
| 2009/0327447 A1 | 12/2009 | Noll et al. | |
| 2010/0083351 A1 | 4/2010 | Ryder | |
| 2010/0122313 A1 | 5/2010 | Ivgi | |
| 2010/0125794 A1 | 5/2010 | Hampton et al. | |
| 2010/0138430 A1 | 6/2010 | Gotou | |
| 2010/0191776 A1 | 7/2010 | McDonald et al. | |
| 2010/0268902 A1 | 10/2010 | Drobychev et al. | |
| 2010/0269158 A1 | 10/2010 | Ehler et al. | |
| 2011/0087690 A1 | 4/2011 | Cairns | |
| 2011/0107320 A1 | 5/2011 | Flisakowski et al. | |
| 2011/0154176 A1 | 6/2011 | Inui et al. | |
| 2011/0161344 A1 | 6/2011 | Anumula et al. | |
| 2012/0016901 A1 * | 1/2012 | Agarwal | G06F 16/258 |
| | | | 707/769 |
| 2012/0136936 A1 | 5/2012 | Quintuna | |
| 2012/0259849 A1 | 10/2012 | Deodhar et al. | |
| 2012/0271853 A1 | 10/2012 | Faitelson et al. | |
| 2012/0304247 A1 | 11/2012 | Badger et al. | |
| 2013/0091188 A1 * | 4/2013 | Du | G06F 16/182 |
| | | | 707/827 |
| 2013/0144911 A1 | 6/2013 | Watanabe | |
| 2013/0161336 A1 | 6/2013 | Forkin | |
| 2013/0219456 A1 * | 8/2013 | Sharma | H04L 9/0894 |
| | | | 726/1 |
| 2013/0227287 A1 * | 8/2013 | Quinlan | G06F 21/88 |
| | | | 713/168 |
| 2013/0232121 A1 * | 9/2013 | Tucker | G06F 16/27 |
| | | | 707/655 |
| 2013/0246932 A1 * | 9/2013 | Zaveri | G06F 3/04883 |
| | | | 715/740 |
| 2013/0247176 A1 | 9/2013 | Itakura | |
| 2013/0268480 A1 | 10/2013 | Dorman | |
| 2013/0276061 A1 * | 10/2013 | Chebiyyam | H04L 63/0245 |
| | | | 726/3 |
| 2013/0282752 A1 | 10/2013 | Day-Richter et al. | |
| 2013/0282755 A1 | 10/2013 | Procopio et al. | |
| 2013/0282790 A1 | 10/2013 | Catmull et al. | |
| 2013/0282830 A1 | 10/2013 | Besen et al. | |
| 2013/0290464 A1 * | 10/2013 | Barrall | G06F 15/167 |
| | | | 709/213 |
| 2013/0304765 A1 * | 11/2013 | Failelson | G06F 21/6236 |
| | | | 707/785 |
| 2013/0311894 A1 | 11/2013 | Rexer et al. | |
| 2013/0346450 A1 | 12/2013 | Procopio et al. | |
| 2013/0347070 A1 * | 12/2013 | Cairns | H04W 4/60 |
| | | | 726/3 |
| 2014/0019497 A1 | 1/2014 | Cidon et al. | |
| 2014/0033271 A1 * | 1/2014 | Barton | H04W 12/64 |
| | | | 726/1 |
| 2014/0059002 A1 | 2/2014 | Lockhart et al. | |
| 2014/0068254 A1 | 3/2014 | Scharf et al. | |
| 2014/0082071 A1 | 3/2014 | Rexer | |
| 2014/0082717 A1 | 3/2014 | Kang et al. | |
| 2014/0089914 A1 | 3/2014 | Kay et al. | |
| 2014/0090012 A1 | 3/2014 | Lim | |
| 2014/0114972 A1 | 4/2014 | Ducott et al. | |
| 2014/0115054 A1 * | 4/2014 | Ibel | G06F 21/6245 |
| | | | 709/204 |
| 2014/0115329 A1 * | 4/2014 | Sturonas | H04L 9/0822 |
| | | | 713/165 |
| 2014/0173700 A1 * | 6/2014 | Awan | H04L 63/107 |
| | | | 726/4 |
| 2014/0181157 A1 | 6/2014 | Houston et al. | |
| 2014/0330776 A1 | 11/2014 | Chen | |
| 2014/0337386 A1 | 11/2014 | Dusevic et al. | |
| 2014/0344456 A1 * | 11/2014 | Buzbee | H04L 67/00 |
| | | | 709/225 |
| 2014/0359085 A1 * | 12/2014 | Chen | H04L 63/102 |
| | | | 709/220 |

(56) References Cited

U.S. PATENT DOCUMENTS

| | | | |
|---|---|---|---|
| 2015/0006606 A1 | 1/2015 | Fleury et al. | |
| 2015/0007264 A1* | 1/2015 | Maldaner | G06F 21/6218 726/3 |
| 2015/0046827 A1* | 2/2015 | Akselrod | G06F 16/908 715/738 |
| 2015/0127937 A1 | 5/2015 | Ali et al. | |
| 2015/0149967 A1 | 5/2015 | Bernstein et al. | |
| 2015/0169616 A1* | 6/2015 | Benraz | G06F 11/1658 707/622 |
| 2015/0228034 A1 | 8/2015 | Alderman et al. | |
| 2015/0324381 A1* | 11/2015 | Brand | G06F 21/6218 707/829 |
| 2015/0330755 A1 | 11/2015 | Citro et al. | |
| 2016/0098574 A1 | 4/2016 | Bargagni | |
| 2016/0149926 A1 | 5/2016 | Ancin et al. | |
| 2016/0162702 A1 | 6/2016 | Tholfsen et al. | |
| 2016/0203153 A1 | 7/2016 | Peng et al. | |
| 2016/0292443 A1 | 10/2016 | von Muhlen et al. | |
| 2016/0308950 A1 | 10/2016 | Bouvrette et al. | |
| 2017/0048315 A1* | 2/2017 | Subramani | H04L 67/1095 |

FOREIGN PATENT DOCUMENTS

| | | | | |
|---|---|---|---|---|
| CN | 104903910 A | * | 9/2015 | ............ G06F 21/53 |
| WO | WO-0138971 A3 | * | 3/2002 | ............ G06F 9/468 |
| WO | WO-2014132246 A1 | * | 9/2014 | ......... G06F 12/1433 |
| WO | WO-2014158832 A1 | * | 10/2014 | ............ G06F 21/57 |
| WO | WO-2015167522 A1 | * | 11/2015 | ....... G06F 17/30424 |
| WO | WO-2018143996 A1 | * | 8/2018 | ............ G06F 15/16 |

OTHER PUBLICATIONS

Microsoft, "How security Descriptors and Access Control Lists Work", 21 pages, Mar. 28, 2003, https://technet.microsoft.com/en-us/library/cc781716(v=ws.10).aspx#w2k3tr_acls_how_jyza.

Microsoft, "How Owners Are Assigned and Changed", Mar. 17, 2013, http://technet.microsoft.com/en-us/library/cc961192.aspx.

Microsoft, Windows XP Professional Product Documentation > Security and administration, "How inheritance affects file and folder permissions", 1 page, May 11, 2013, https://www.microsoft.com/resources/documentation/windows/xp/all/proddocs/en-us/acl_inherit_permissions.mspx?mfr=true.

Microsoft, Windows XP Professional Product Documentation > Security and administration, "To set, view, change, or remove special permissions for files and folders", 2 pages, Oct. 4, 2013, https://www.microsoft.com/resources/documentation/windos/xp/all/proddocs/en-us/acl_inherit_permissions.mspx?mfr=true.

Microsoft, Windows XP Professional Product Documentation > Security and administration, "Permissions", 1 page, Sep. 15, 2012, https://www.microsoft.com/resources/documentation/windows/xp/all/proddocs/en-us/acl_inherit_permissions.mspx?mfr=true.

Microsoft, https://technet.microsoft.com/en-us/library/dd277411.aspx, Apr. 23, 2014, Technet.

NTFS, http://ntfs.com/ntfs-permissions-explicit.htm, Mar. 26, 2014, NTFS.com.

Microsoft, https://microsoft.com/resources/documentation/windows/xp/all/proddocs/en-us/acl_inherit_permissions.mspx?mfr=true, May 11, 2013, Microsoft.com.

Ching-man Au Yeung, Providing Access Control to Online Photo Albums Based on Tags and Linked Data, 2009, 1 School of Electronics and Computer Science, University of Southampton Southampton, SO17 1 BJ, United Kingdom, pp. 9-14 (Year: 2009).

* cited by examiner

SYSTEM AND METHOD FOR RECURSIVE PROPAGATING APPLICATION ACCESS CONTROL

CROSS-REFERENCE TO RELATED APPLICATIONS

This application is a continuation application of co-pending U.S. patent application Ser. No. 16/398,198, filed Apr. 29, 2019, which is a continuation of U.S. patent application Ser. No. 14/709,179, filed May 11, 2015, now U.S. Pat. No. 10,277,601, each of which is incorporated herein by reference.

BACKGROUND

A cloud storage user can install and use third-party applications. Some applications benefit from accessing content created outside of the application. For example, a photo editor application may not create content, but the photo editor application can access some existing image content to enhance, crop, and perform other modifications to the content. However, a user may not trust a third-party application to access all of their content. For example, a user can configure different access permission to folders or contents such that third-party applications may not have access to private and confidential content, but the third-party application may be able to access public content, e.g., a user can allow a third-party drive application to edit the photos in a public folder on the user's cloud storage.

To open all the photos with the third-party application, when the user has all images in a single directory named "Photos," the user usually browses and opens all the images from within the image viewing application by first performing an "open" operation in the cloud storage User Interface (UI) on each and every image to make the image accessible to the application. Similarly, when the user puts media files in an album folder, the user cannot open the album folder in a music player application and play all the songs in it, or a zip 20 creator application cannot zip up the contents of a folder unless the user explicitly opens each and every file beforehand.

Existing mechanisms to manage sharable storage for limiting third-party application access to user content do not allow a user to configure specific access control to folders or contents. In that case, users may grant overly-broad access to applications or have to grant access to each file one-by-one in a tedious manner. For example, applications may be granted access to read all files of a particular type, which may be too narrow or too broad access. In another example, to configure access control for a particular application, the content usually has to be stored in a location private to the application, making it inaccessible to other applications. For example, some wire framing applications may store multiple types of files in a project organized in specific folders such that other applications cannot access. Some of the files are common file types (such as images) which other applications may be able to support. The user can grant the wire framing application access only to certain project folders, and prevent another application from having access to the content the images wire framing application uses because they would reside in a folder private to the particular wire framing application. In another example, some file transfer and storage applications may allow third-party applications to access a single folder owned by the application itself, or to have access to all files of a specific type on the cloud drive. Such access configuration, however, grants all-or-nothing access authorization to a certain folder or a certain file type on a user's storage drive associated with the respective file transfer and storage application itself, but does not allow restricting certain file types of a particular folder. For another example, some file storage applications only allow access to all of a user's content or all of an enterprise's content stored on an online drive associated with the file storage application, without specific configuration to grant an application access to a subset of specific content on the user's content on the online drive.

SUMMARY

A system and method for recursive propagating application access control is described which relates to managing third-party application access to content files and folders on a cloud storage system. The access control system may receive an access authorization indication to grant a third-party entity access to a first file in a parent folder, and then modify an access control rule associated with the parent folder based on the access authorization indication. The modified access control rule is propagated to a child folder of the parent folder, and thus the third-party entity is granted access to a second file in the child folder 20 based on the modified access control rule. The second file shares a common attribute with the first file, and the modified access control rule specifies the common attribute.

Figure 1:
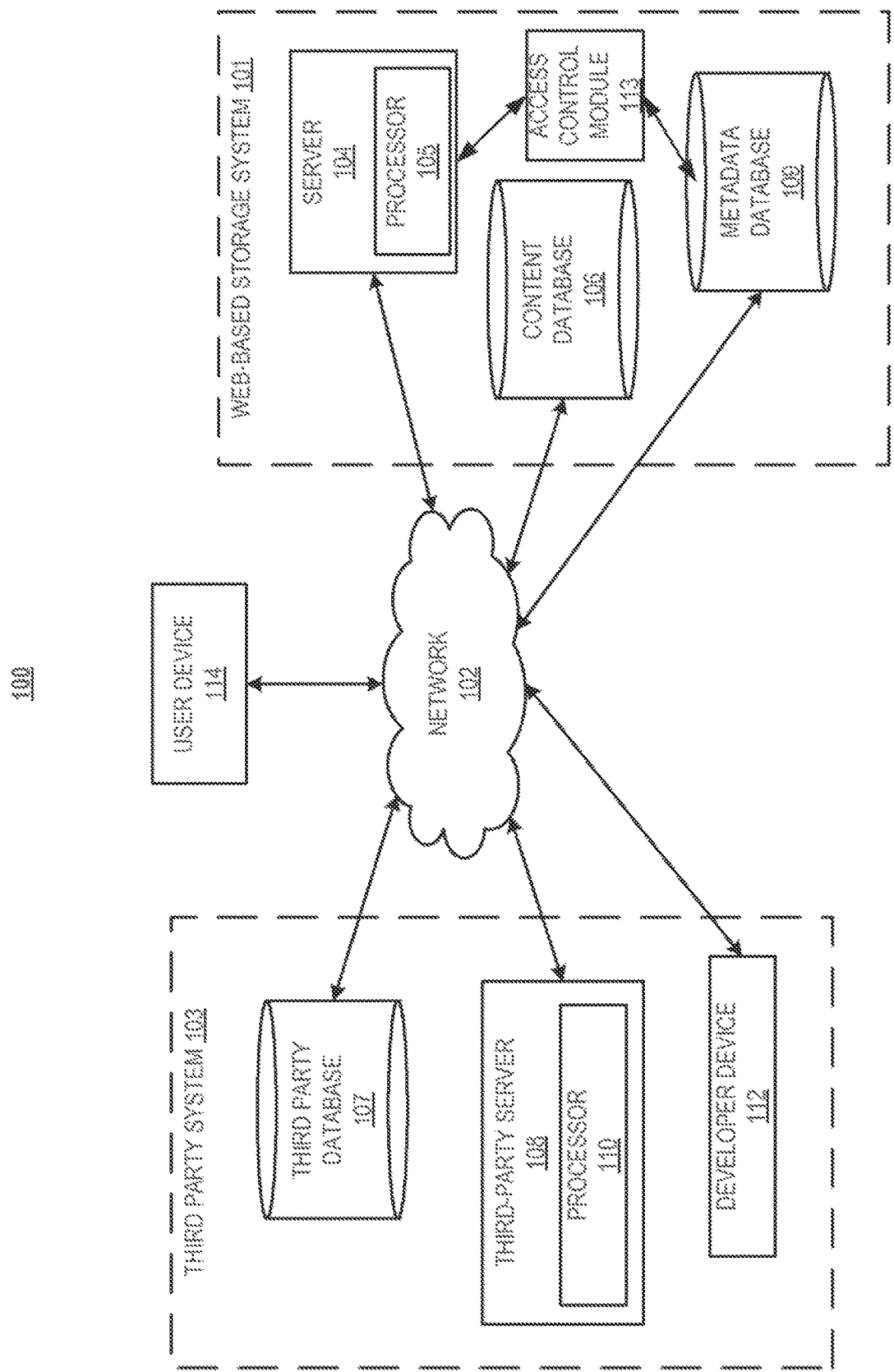
FIG. 1 is a schematic diagram of a system for application-specific access control in accordance with one or more implementations of the disclosure.

Implementations are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

To provide an overall understanding of the systems and methods described herein, certain illustrative implementations will now be described. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof. Generally, the computerized systems described herein may comprise one or more engines, which include a processing device or devices, such as a computer, microprocessor, logic device or other device or processor that is configured with hardware, firmware, and software to carry out one or more of the computerized methods described herein.

The present disclosure provides systems and methods for providing third-party applications with access to file content on a web-based storage system. Specifically, a user can configure user-specific and application-specific access control for a third-party application to access file content. For example, a user can authorize a third-party application to access a file or a folder on the cloud storage, e.g., by opening a file within the third-party application, by editing or creating a file within the third-party application, etc., and the access authorization can be propagated downwardly to subfolders of the folder such that the third-party application is automatically granted access to subfolders of the folder, without the user having to further specify the access authorization in the subfolders. The systems and methods disclosed herein are described in terms of third-party applications or applications. In general, the systems and methods are applicable to third-party entities, such as third-party users, third-party operating systems, third-party servers, and/or the like. The systems and methods disclosed herein are described in terms of a web-based storage system, which may communicate with other systems over a network to store and share user data. In general, one of ordinary skill in the art will understand that the systems and methods described herein are applicable to systems that are locally interconnected without departing from the scope thereof.

FIG. 1 depicts an example of a network and database structure that may be used to implement the systems and methods herein. FIG. 1 is a block diagram of a computerized system 100 for allowing third-party applications to access representations of files stored on a web-based storage system. The system 100 includes a web-based storage system 101, a user device 114, and a third-party system 103. The web-based storage system 101 includes a server 104 including a processor 105, a content database 106, an access control module 113 and a metadata database 109. The access control module 113 may be integrated with the processor 105 and the server 104, and/or may be a standalone component, hardware or software module. The third-party system 103 includes a third-party database 107, a third-party server 108 including a processor 110, and a developer device 112. As used herein, the term "processor" or "computing device" refers to one or more computers, microprocessors, logic devices, servers, or other devices configured with hardware, firmware, and software to carry out one or more of the computerized techniques described herein. Processors and processing devices may also include one or more memory devices for storing inputs, outputs, and data that are currently being processed. An illustrative computing device 1000, which may be used to implement any of the processors and servers described herein, is described in detail with reference to FIG. 10. As used herein, "developer device" and "user device" include, without limitation, any suitable combination of one or more input devices (e.g., keypads, touch screens, trackballs, voice recognition systems, etc.) and/or one or more output devices (e.g., visual displays, speakers, tactile displays, printing devices, etc.). As used herein, "server" includes, without limitation, any suitable combination of one or more devices configured with hardware, firmware, and software to carry out one or more of the computerized techniques described herein. Only one web-based storage system 101, one user device 114, and one third-party system 103 are shown in FIG. 1 to avoid complicating the drawing. In general, the system 100 can support multiple web-based storage systems, third-party systems, servers, databases, developer devices, and user devices.

The web-based storage system 101 is a file hosting system that allows users to store, retrieve, and modify data via one or more user devices such as the user device 114. This data may be referred to as a user's web data. As an example, the web-based storage system 101 may be stored on a single server system or in a distributed system. In particular, the web-based storage system 101 may use cloud storage to store user data.

The content database 106 stores content files, which may be viewed or edited using various applications such as native applications, or third-party applications. Native applications correspond to internal, first-party applications in the web-based storage system 101. As an example, the native application may provide access between the user and the native file over a web browser (i.e., for viewing and/or editing a native document). Alternatively, files in the content database 106 may be accessed, edited, and/or saved via a third-party application, e.g., applications that are not internal to or affiliated with the web-based storage system 101. For example, a photo management application can include a third-party application that is different from a user or a cloud storage system, which can access stored images at the cloud storage system on behalf of the user, to facilitate the user to view, edit, create, delete or perform other operations with the stored images.

The metadata database 109 stores several types of data. In particular, the metadata database 109 stores metadata associated with file content stored on the web-based storage system 101 or on the third-party system 103. The metadata may include file ownership information, editing history, authorship information, blacklist or whitelist access information, file type, and/or the like. For example, the metadata may include an application access list (ACL) entry that specifies third-party applications that are authorized to access a file or a folder. Such access control information can also be referenced in the third-party database 107, e.g., for data entries associated with a third-party application.

The third-party system 103 communicates with the web-based storage system 101 over the network 102 to access a representation of a native file stored on the native database 106. As depicted in FIG. 1, the third-party system 103 includes a third-party database 107, a third-party server 108, and a developer device 112. The third-party database 107 may store third-party files in a particular format suitable for the third-party system 103.

It is sometimes desirable for the third-party application to access the contents of a content file so that the third-party application can operate on file content. The third-party application may be unable to directly access the raw content of the file if the ACL entry associated with the file does not include the third-party application. The access control module 113 (via the processor 105) may grant access to a third-party application to access content files in the content database 106. The third-party application may then use one or more application programming interfaces (APIs) to access files on the web-based storage system 101.

To provide access of the content of the native file to the third-party application, the processor 105 and/or the access control module 113 may create or modify an ACL entry associated with a folder or a file, and then propagate the modification of the ACL entry downwardly to a hierarchy of subfolders of the instant folder such that the third-party application may be able to access content files in the subfolders without further explicit user authorization. In some instances, the ACL entry can be user specific, e.g., a third-party application is authorized access to contents on behalf of a user but may be denied access to the same contents when acting on behalf of another unauthorized user. In a further implementation, the ACL entry can be content or file-type specific, e.g., access for the third-party application may be restricted to a certain file or content type, and/or the like.

Figure 2:
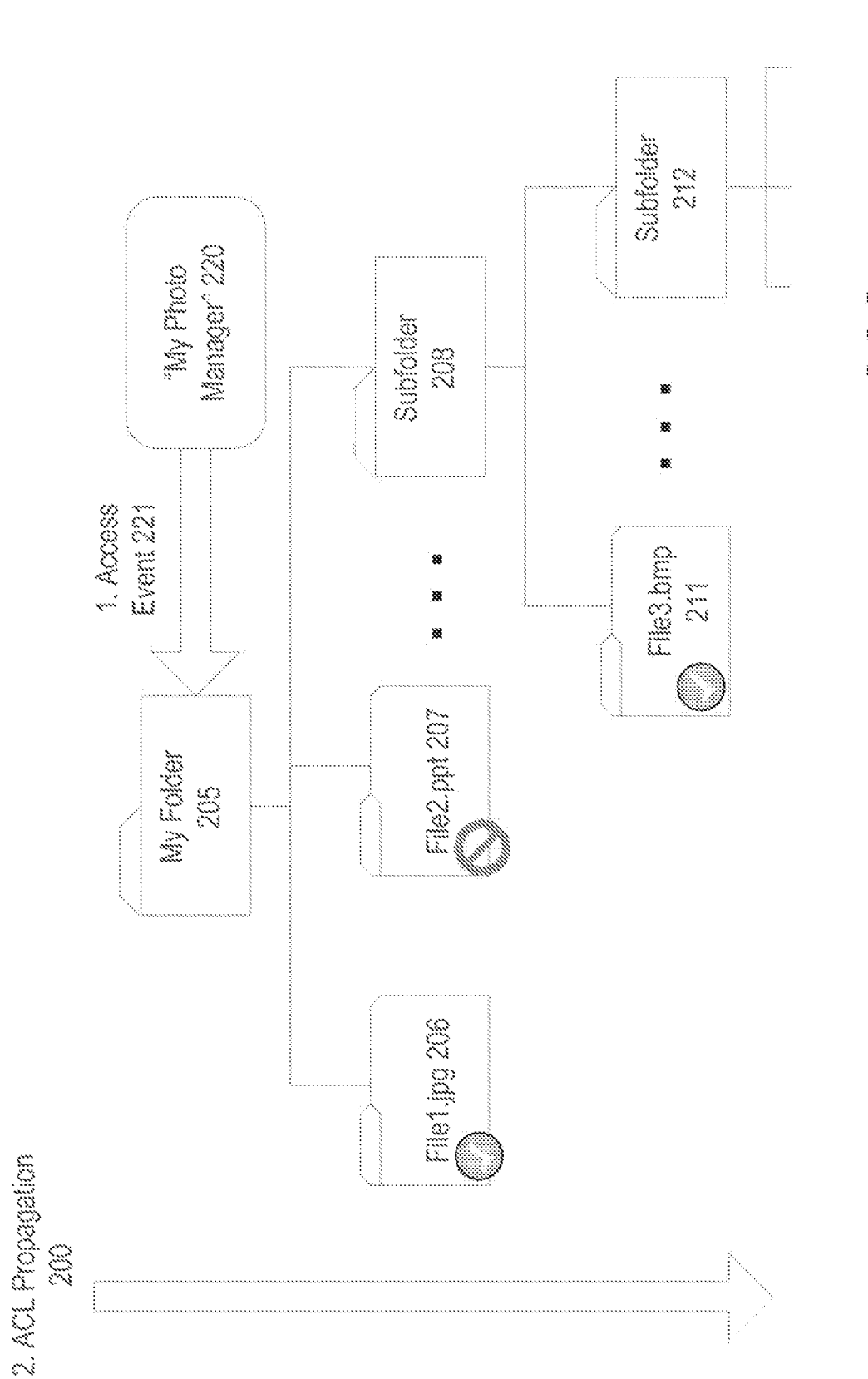
FIG. 2 is an example block diagram illustrating aspects of top-down ACL propagation among a hierarchy of folders and files, according to some implementations of the disclosure.

FIG. 2 is an example block diagram illustrating aspects of top-down ACL propagation among a hierarchy of folders and files, according to some implementations of the disclosure. In some instances, a third-party application (e.g., "my photo manager" 220) is granted access to a folder and/or a file 205 at an access event 221, including but not limited to the following scenarios: the third-party application has been used to open and view files, save changes to files that are opened using the third-party application, or create new files using the third-party application, at a cloud storage system.

When the access event 221 is captured at the level of the instant folder, e.g., "my folder" 205, the ACL entry associated with the folder can be modified to allow access for the third-party application, and the modification can be propagated (e.g., ACL propagation 200) to the sub folders (e.g., subfolder 208, subfolder 212, etc.) of "my folder" 205. Upon the ACL propagation, contents of "my folder" 205, contents of "subfolder" 208, and contents of "subfolder" 212 may be accessible by the third-party application "my photo manager" 200. In a further implementation, the ACL propagation may be content-specific. In the respective example shown in FIG. 2, the third-party application "my photo manager" 220 may be granted access to image content, e.g., for files with an image file format such as but not limited to JPG, BMP, PNG, GIF, and/or the like. Thus the third-party application "my photo manager" 220 may access "File1.jpg" 206 in the "my folder" 205, and "file3.bmp" 211 in the subfolder 208, but not "file2.ppt" 207, which is not of an authorized content type although it is within the access-allowed folder.

Figure 3:
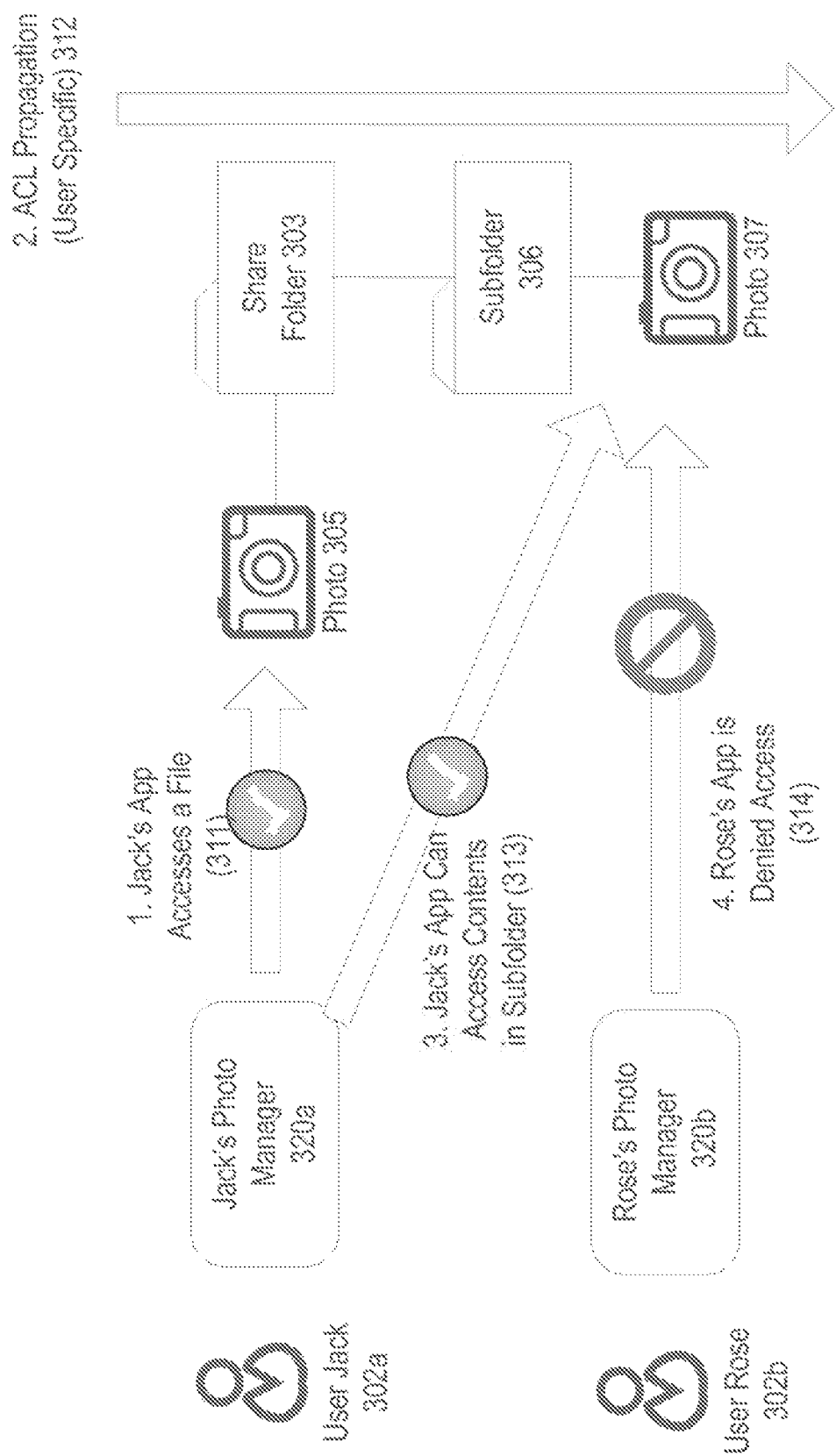
FIG. 3 is an example block diagram illustrating aspects of user-specific access propagation, according to some implementations of the disclosure.

FIG. 3 is an example block diagram illustrating aspects of user-specific access propagation, according to some implementations of the disclosure. In some instances, the access propagation can be user-specific, e.g., a third-party application may only access contents and folders on the cloud storage on behalf of a particular user, if the particular user grants the third-party application access in the first place. As shown in FIG. 3, a first user (e.g., "Jack" 302a) can instantiate a third-party application 320a, to access a file such as a photo 305 under a share folder 303 on the cloud storage (e.g., at 311). For example, user "Jack" 302a may login to the photo manager application to engage the photo manager to open and/or edit a photo 305. In this way, the ACL entry associated with the share folder 303 may be modified with information specific to user "Jack" 302a, and the ACL propagation 312 can be propagated to subfolder 306 with user specific information. Thus, user "Jack" 302a can operate the photo manager 320a (e.g., by login into his account) and access to a photo 307 under the sub folder 306 (e.g., at 313). Another user "Rose" 302b, may not be able to access the photo 307 with the same third-party application 320b but logged in with Rose's information, e.g., at 314, because the ACL propagation has only authorized access on behalf of user "Jack." In this way, when user "Jack" 302a has used a third-party application to access his private content, a different user (e.g., user "Rose" 302b) may not be able to engage the same third-party application to access such content.

Figure 4:
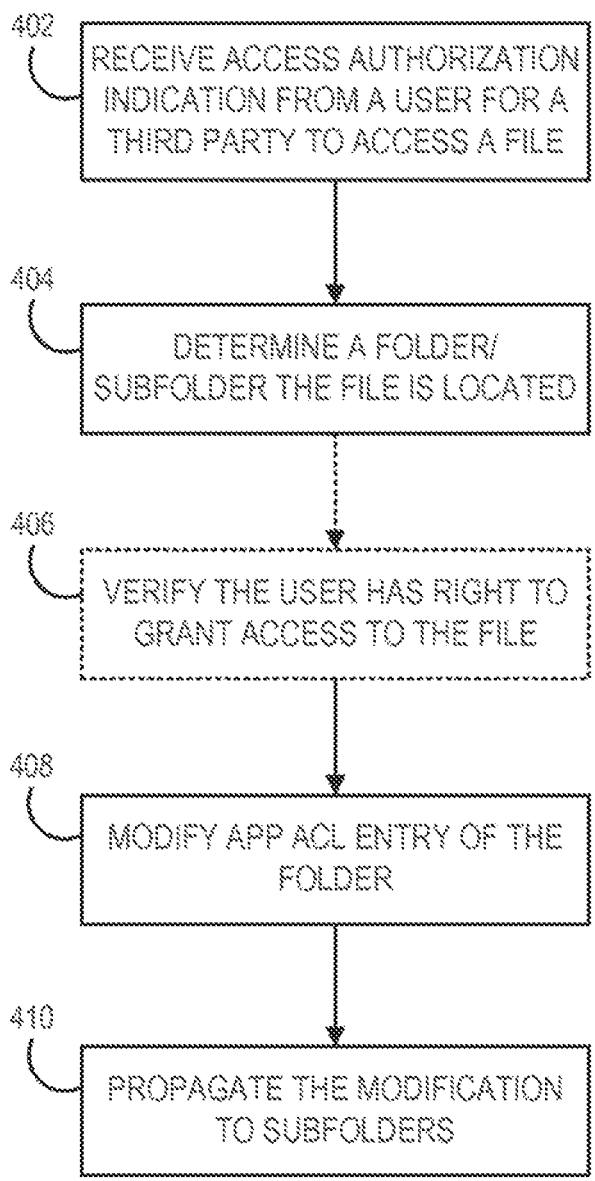
FIG. 4 is an example logic flow diagram illustrating aspects of application access propagation for third-party access control, according to some implementations of the disclosure.

FIG. 4 is an example logic flow diagram 400 illustrating aspects of application access propagation for third-party application access control, according to some implementations of the disclosure. In some instances, an access control module (e.g., 113 in FIG. 1) at a cloud storage system may receive an access authorization indication for a third-party application to access a file or a folder, e.g., at 402. For example, the access authorization indication may include but not be limited to a user opening a folder or a file using the third-party application, viewing a folder or a file using the third-party application, creating a new folder or a file using the third-party application, saving changes to a file using the third-party application, and/or the like. The access control module may then determine a folder and/or a sub-folder the file is located at, e.g., at 404. For example, the folder where the file is located can be a parent folder of another child folder, and/or can be a child folder of another parent folder.

In some instances, the access control module can optionally verify that the user has the right to grant access to the folder or file for the third-party application, e.g., at 406. For example, when a user attempts to engage a third-party application to access private content that has been configured with limited access by another user, access may be denied, and the user may not be able to access or grant access to the folder or file for the third-party application.

At 408, the access control module may modify an ACL entry of the folder to include the third-party application information, user information, and (optional) file/content type information, and/or the like. For example, the cloud storage may employ an API scope to optionally propagate ACL updates and add a per-item and per-user AppAcl field to the ACL entry. At 410, the modification can be propagated to subfolders, e.g., children folders of the folder. For example, the access control module can propagate the AppAcl field from parent to children with a task and add AppAcl entries to the authorized applications CSV. A "propagate" flag can be added to a data field that shows the status of propagation. For example, when the status is true, the mode of propagation is set to ACTIVE (propagating) on the ACL entry; when false, the mode can be set to LEGACY (non-propagating) on the ACL entry.

In some instances, changes in an ACL entry can propagate to children when a parent is added, e.g., a file can be placed in a folder, or reside in multiple folders. An ACL entry can be revoked by its owner, but removal of application ACL entries may not propagate; instead, a user-initiated revoke-all operation can remove entries, such as uninstallation of the application, deleting (and then restoring) a folder or a file. For example, a separate application version scheme allows files or folders which are not in the user's corpus at uninstall time to be revoked, e.g., when an application is installed, a counter stored in a user attribute data field is incremented; when an application ACL entry is added, the current value of this counter is inserted with it; when application ACL entries are returned, those with values less than the current counter can be ignored. This scheme allows the application ACL cleanup process at uninstall time to be efficient while still ensuring immediate revocation. An example pseudo-code segment illustrating an application ACL propagation operation can take a form similar to the following:

```
// An application ACL.
message AppAcl {
// The unordered list of authorized applications.
repeated AppAclEntry entry=1
}
// Authorization for a single application.
message AppAclEntry {
// The application to grant access to.
optional AppAclId id=1;
// The time when access was granted in milliseconds since
the epoch.
optional int64 grant_time_millis=2;
// The behavior modes a file scope app ACL entry can
possess.
enum FileScopeMode {
// Original file scope behavior: entry was explicitly opened
and should
// not propagate.
LEGACY=0;
// Access was propagated to this entry, it was not explicitly
opened.
PASSIVE=1;
// Entry was explicitly opened and propagates access to
children.
ACTIVE=2;
}
// Must be set if and only if id.type is FILE_SCOPE.
optional FileScopeMode file_scope_mode=4;
}
// The unique identifier of an application ACL entry.
message AppAclId {
enum IdType {
FILE_SCOPE=1;
}
// The type of app ACL entry.
Optional IdType type=1;
// The app ID. See http://go/devconsole-projectid for app ID
spec.
optional string app_id=2;
// The Gaia ID of the user this app ACL entry applies to.
optional int64 user_gaia_id=3;
}
// This message is added as a new field to the DirEntry
message:
message DirEntry {
...
optional AppAcl app_ad=1234;
... }
```

In some instances, the downward propagation may happen when an access authorization indication takes place at a folder (e.g., when the third-party application has been authorized to access a folder), then the ACL propagates to all the files and subfolders within the folder recursively, e.g., at each subfolder level, the propagation is repeated downwardly through the hierarchy of folders. In some instance, if the access authorization is performed at a specific file, the access authorization may not propagate to subfolders in the current folder where the specific file is located. In further instances, propagation can terminate at an inaccessible item, e.g., when a subfolder of an authorized folder is configured to be "private," the propagation may not extend to the private folder.

Figure 5:
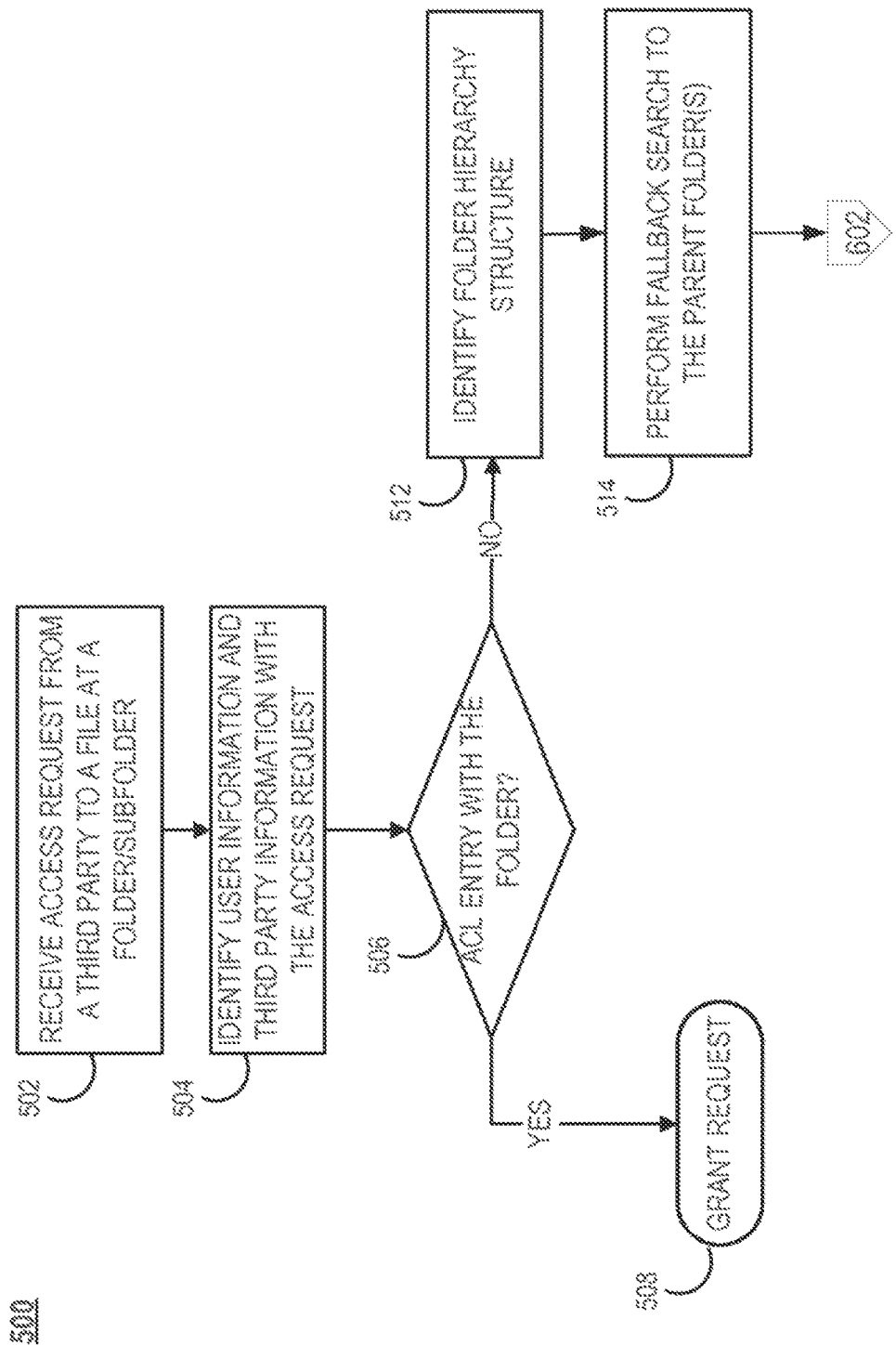
FIGS. 5-6 are example logic flow diagrams illustrating aspects of fallback search for third-party application access, according to some implementations of the disclosure.
Figure 6:
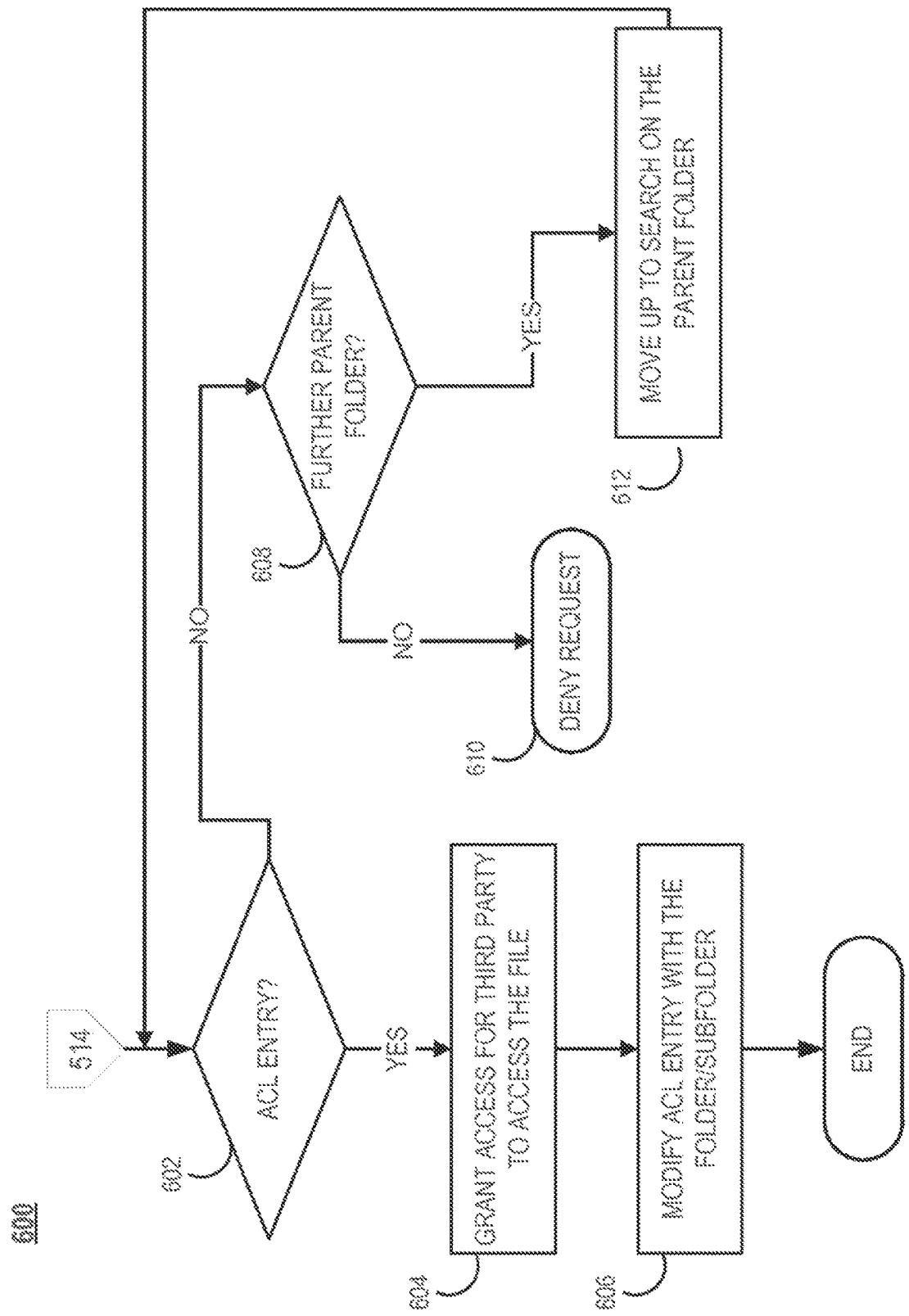

FIGS. 5-6 are example logic flow diagrams 500-600 illustrating aspects of fallback search for third-party application access, according to some implementations of the disclosure. The propagation that implements folder access inheritance can be done asynchronously, because synchronous propagation may be prohibitively expensive. For example, the downward ACL propagation may not occur immediately when a third-party application is granted access to a parent folder, and the application may not be able to access all content within the folder immediately. To address this issue, a fallback search can be performed up the parent tree for application access o allow an application to access all content as soon as the folder is granted access, which may achieve a comparable synchronization performance as synchronous propagation.

As shown in FIG. 5, a cloud storage system can receive an access request from a third-party application to access a file located within a folder or subfolder, e.g., at 502. An access control module may identify user information and third-party application information from the request at 504. If an ACL entry associated with the current folder exists and authorizes the third-party application to access at 506, the request may be granted at 508. Otherwise, a fallback search can be implemented by identifying a folder hierarchy at 512 and searching up the parent folder for an ACL entry at 514.

Continuing on with FIG. 6, if an ACL entry exists at the parent folder to authorize access for the third-party application at 602, the third-party application may be granted access to access the file at 604, and the ACL entry can be propagated to the child folder/subfolder where the file is located, e.g., at 606. Otherwise, if the first-degree parent folder does not have such ACL entries and if there is another level of parent folder at 608, the fallback search may optionally move up to a second-degree parent folder at 612. If there is no other second-degree parent folder, then the access request may be denied at 610. The fallback search on the entire parent tree may also be prohibitively expensive. Additional fallback search rules may apply to restrict the search to ID queries, limited degrees of parent folder search, listed child folder search, and/or the like.

Figure 7:
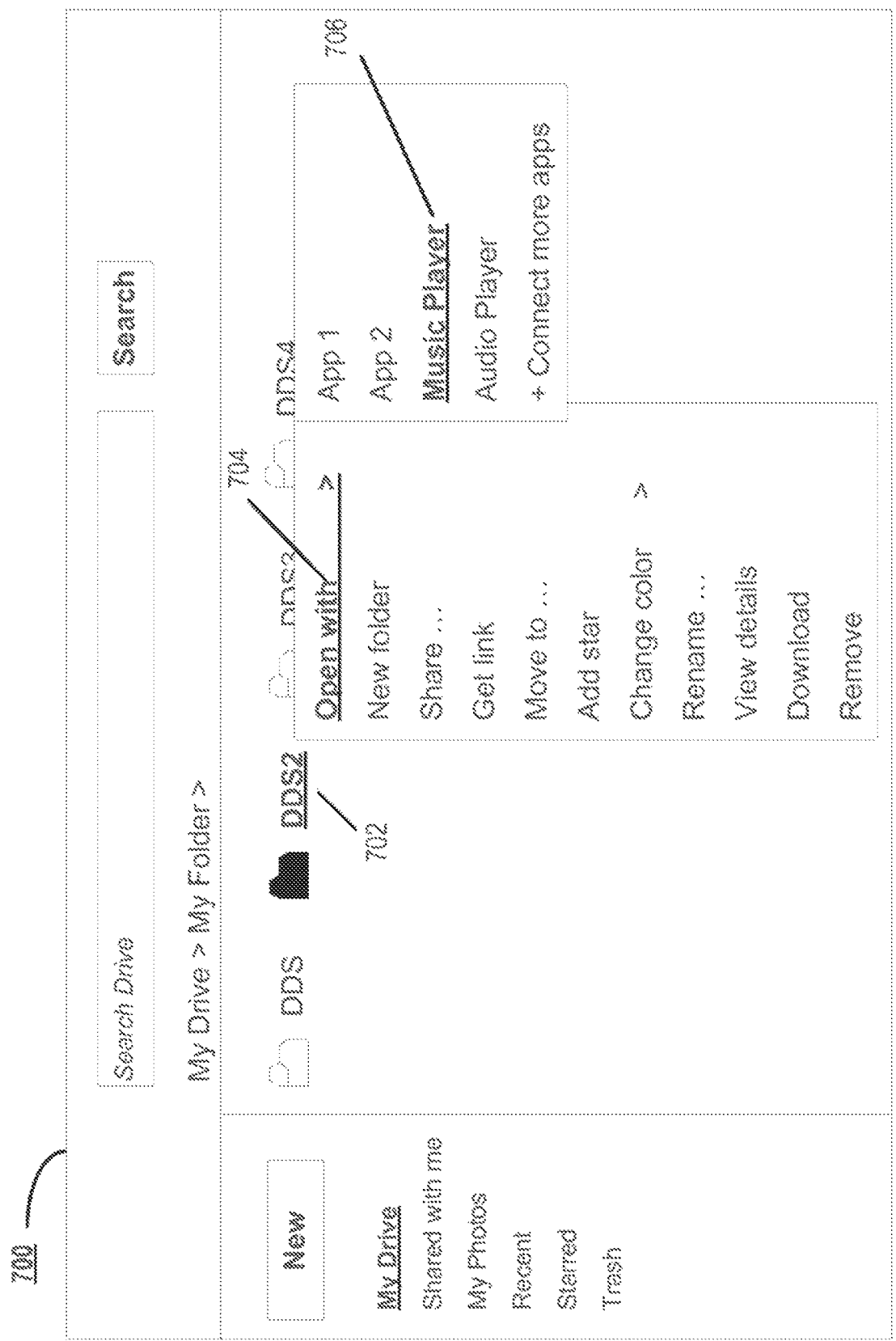
FIGS. 7-9 are example user interface (UI) diagrams illustrating third-party application access control on a cloud storage system, according to some implementations of the disclosure.
Figure 8:
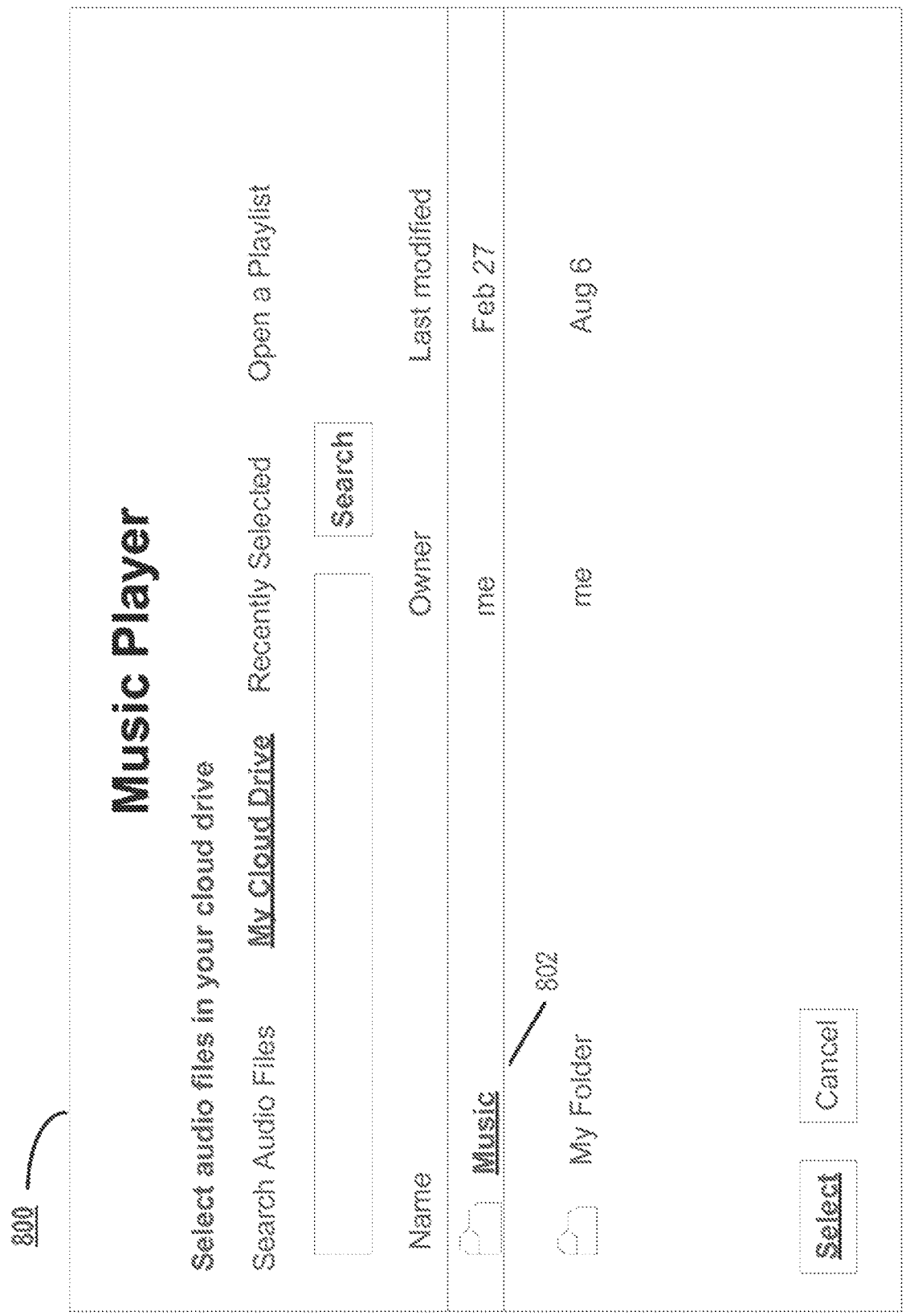
Figure 9:
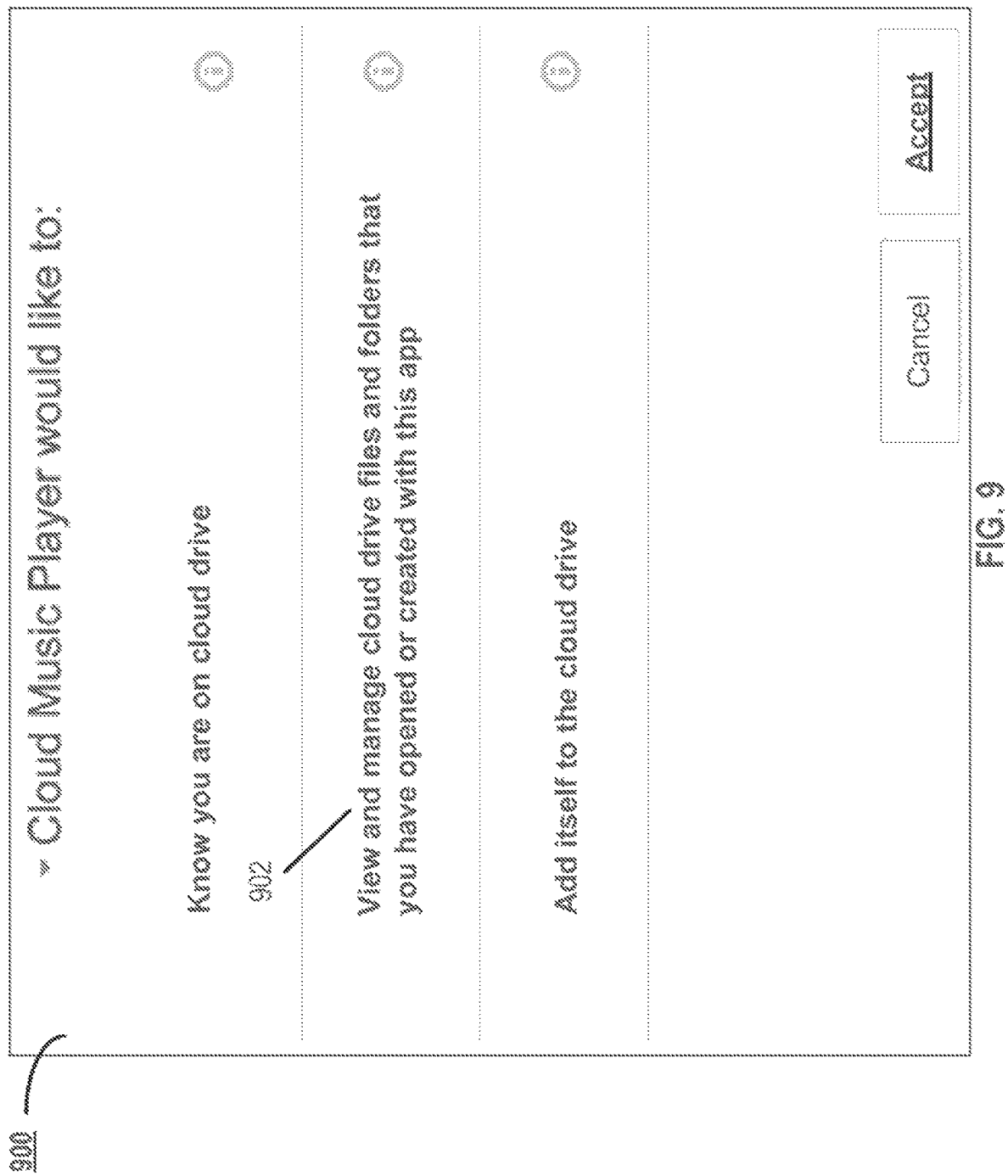

FIGS. 7-9 are example user interface (UI) diagrams illustrating third-party application access control on a cloud storage system, according to some implementations of the disclosure. As shown in FIG. 7, a user can access a cloud storage system via a web browser UI 700. The user can grant access for a third-party application to access a folder 702 by right-clicking to obtain an "Open with" context menu at 704. The user can then select to "Open With" a third-party application such as "Music Player" 706, the Music Player application 706 can then gain access to the folder 704 and all of its children.

As shown in FIG. 8, the third-party application, e.g., "Music Player" can provide a file picker widget UI 800 to prompt a user to select files that the application does not currently have access to. Upon user selection, the application can gain access to the selected item(s), e.g., folder 802, and the children of folders are also authorized when the folder 802 is selected.

As shown in FIG. 9, the cloud storage system may prompt a user to confirm authorization with an initial authorization dialog box 900, e.g., to confirm that the user agrees to view and manage cloud files and/or folders that are opened or created within the application at 902. For example, upon confirmation of access authorization, a user may view files from the cloud storage that have been opened with this application or that are shared publicly; save changes to files that are opened with this app; create new files in the cloud storage using this app; view folders and their contents from the cloud storage that are opened with this app; make changes to folders and their contents that are opened with this app; delete contents of folders that are opened with this application, and/or the like.

In further implementations, the access control operations discussed in connection with FIGS. 1-9 can be employed in various different ways. For example, the access control module may adopt synchronous propagation when an authorization indication is received. Or alternatively, fallback search tree for a folder can be implemented for granting access at all times without ACL propagation. Shared application access can be granted, e.g., if user A grants an application access to a shared folder, then the application can read that folder as user B. Instant access revocation for an entire application can be performed without having to uninstall the application.

The approaches and systems described herein may be deployed in part or in whole through a machine that executes computer software, program codes, and/or instructions on one or more processors contained in the client devices and/or the server or servers associated with the web-based storage system.

Implementations of the disclosure may include a method on a machine, a system or apparatus as part of or in relation to the machine, or a computer program product embodied in a computer readable medium executing on one or more of the machines. The one or more processors may be part of a server, client, network infrastructure, mobile computing platform, stationary computing platform, or other computing platform.

A processor may be any kind of computational or processing device capable of executing program instructions, codes, binary instructions and the like. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

Figure 10:
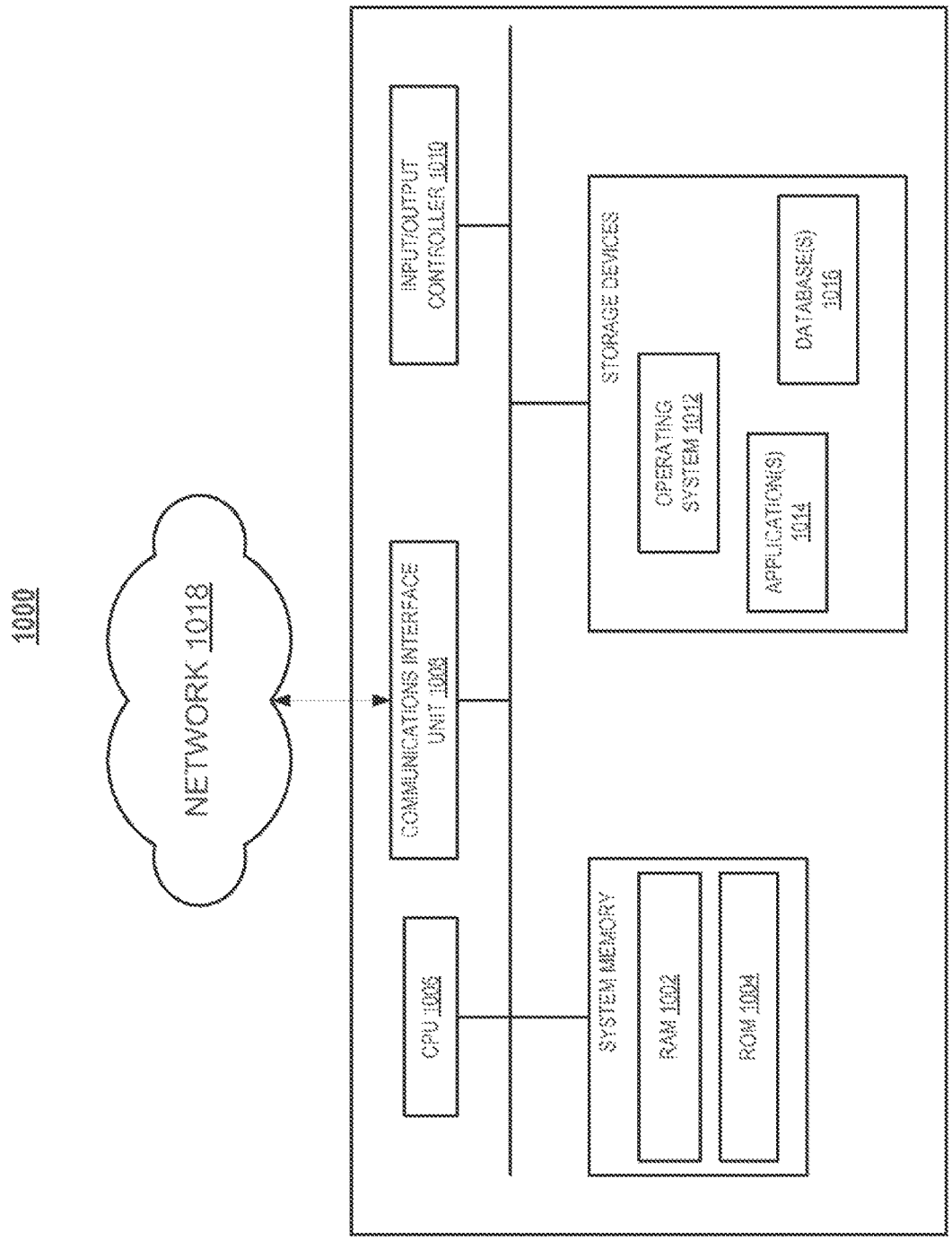
FIG. 10 is a schematic diagram of an exemplary computer system employed in accordance with one or more implementations of the disclosure.

FIG. 10 is a block diagram illustrating an exemplary computer system 1000 with which the system for access control propagation and use of FIGS. 1-9 can be implemented. In certain aspects, the computer system 1000 may be implemented using hardware or a combination of software and hardware, either in a dedicated server, or integrated into another entity, or distributed across multiple entities.

Computer system 1000 includes a bus 1008 or other communication mechanism for communicating information, and a processor 1002 coupled with bus 1008 for processing information. By way of example, the computer system 1000 may be implemented with one or more processors 1002.

Computer system 1000 can include, in addition to hardware, code that creates an execution environment for the computer program in question, e.g., code that constitutes processor firmware, a protocol stack, a database management system, an operating system, or a combination of one or more of them stored in an included memory 1004, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 1008 for storing information and instructions to be executed by processor 1002. The processor 1002 and the memory 1004 can be supplemented by, or incorporated in, logic circuitry.

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more location without deviating from the scope of the disclosed subject matter. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure.

Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various techniques identified and described above may be varied, and that the order of techniques may be adapted to particular applications of the techniques disclosed herein. All such variations and modifications are intended to fall within the scope of this disclosure. As such, the depiction and/or description of an order for various techniques should not be understood to require a particular order of execution for those techniques, unless required by a particular application, or explicitly stated or otherwise clear from the context.

The methods and/or processes described above, and techniques thereof, may be realized in hardware, or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application-specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The instructions may be stored in the memory 1004 and implemented in one or more computer program products, i.e., one or more modules of computer program instructions encoded on a computer readable medium for execution by, or to control the operation of, the service, and according to any method well known to those of skill in the art, including, but not limited to, computer languages such as data-oriented languages (e.g., SQL, dBase), system languages (e.g., C, Objective-C, C++, Assembly), architectural languages (e.g., Java .NET), and application languages (e.g., PHP, Ruby, Perl, Python).

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1000 further includes a data storage device 1006 such as a magnetic disk or optical disk, coupled to bus 1008 for storing information and instructions. Computer system 1000 may be coupled via an input/output module 1010 to various devices. The input/output module 1010 can be any input/output module. Example input/output modules 1010 include data ports such as USB ports. The input/output module 1010 is configured to connect to a communications module 1012. Example communications modules 1012 include networking interface cards, such as Ethernet cards and modems. In certain aspects, the input/output module 1010 is configured to connect to a plurality of devices, such as an input device 1014 and/or an output device 1016. Example input devices 1014 include a keyboard and a pointing device, e.g., a mouse or a trackball, by which a user can provide input to the computer system 1000. Other kinds of input devices 1014 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 1016 include display devices, such as a CRT (cathode ray tube) or LCD (liquid crystal display) monitor, for displaying information to the user.

According to one aspect of the present disclosure, the system for application-specific file type generation and use as shown in FIGS. 1-2, can be implemented using a computer system 1000 in response to processor 1002 executing one or more sequences of one or more instructions contained in memory 1004. Such instructions may be read into memory 1004 from another machine-readable medium, such as data storage device 1006. Execution of the sequences of instructions contained in main memory 1004 causes processor 1002 to perform the processes described herein. One or more processors in a multi-processing arrangement may also be employed to execute the sequences of instructions contained in memory 1004. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a personal area network (PAN), a local area network (LAN), a campus area network (CAN), a metropolitan area network (MAN), a wide area network (WAN), a broadband network (BBN), the Internet, and the like. Further, the communication networks can include, but are not limited to, for example, any one or more of the following network topologies, including a bus network, a star network, a ring network, a mesh network, a star-bus network, tree or hierarchical network, or the like. The communications modules can be, for example, modems or Ethernet cards.

As discussed above, computing system 1000 can include clients and servers. A client and server are generally remote from each other and typically interact through a communication network. The relationship of client and server arises by virtue of computer programs running on the respective computers and having a client-server relationship to each other. Computer system 1000 can be, for example, and without limitation, an enterprise server or group of servers, one or more desktop computers, one or more laptop computers, etc. Computer system 1000 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions to processor 1002 for execution. Such a medium may take many forms, including, but not limited to, non-volatile media, volatile media, and transmission media. Non-volatile media include, for example, optical or magnetic disks, such as data storage device 1006. Volatile media include dynamic memory, such as memory 1004. Transmission media include coaxial cables, copper wire, and fiber optics, including the wires that comprise bus 1008. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

While this specification contains many specifics, these should not be construed as limitations on the scope of what may be claimed, but rather as descriptions of particular implementations of the subject matter. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A method comprising:
   receiving, by a cloud storage system that stores a plurality of files for a plurality of user accounts, a request to access a file of the plurality of files from an external content handling application on behalf of a first user account of the plurality of user accounts, wherein the external content handling application is an application provided by an external system that is connected to the cloud storage system via a network;
   determining, by the cloud storage system and based on one or more access control lists (ACLs) associated with a shared folder containing the file stored on the cloud storage system, that the external content handling application executing on a user device associated with the first user account is not allowed to access the file on behalf of the first user account, wherein the shared folder is accessible to a set of user accounts including the first user account and a second user account of the cloud storage system, and wherein the one or more ACLs associated with the shared folder do not specify access to files in the shared folder for the external content handling application;
   receiving, by the cloud storage system and from the user device associated with the first user account, a message authorizing the external content handling application to access the file on behalf of the first user account; and
   responsive to the receiving of the message authorizing the external content handling application to access the file on behalf of the first user account associated with a first user:
      modifying, by the cloud storage system and without any further input of the first user, the one or more ACLs associated with the shared folder containing the file and a subfolder on the cloud storage system, wherein modifying the one or more ACLs associated with the shared folder comprises including user information of the first user account and application information of the external content handling application in the one or more ACLs, wherein responsive to the receiving of the message authorizing the external content handling application to access the file on behalf of the first user account, the one or more ACLs are modified for the shared folder and not for the subfolder of the shared folder; and
      allowing, by the cloud storage system, the external content handling application to access the file on behalf of the first user account based on the user information of the first user account and the application information of the external content handling application in the modified ACLs associated with the shared folder, wherein the modified ACLs associated with the shared folder prevent the external content handling application to access the file on behalf of the second user account.

2. The method of claim 1, further comprising:
receiving, by the cloud storage system, another request to access the file from the external content handling application on behalf of the second user account;
determining whether to grant or deny access to the file for the external content handling application on behalf of the second user account based on one or more user information and one or more application information included in the modified ACLs associated with the shared folder, the one or more user information including (i) the user information of the first user account but not the user information of the second user account and (ii) the one or more application information including the application information of the external content handling application; and
responsive to determining that the ACLs associated with the shared folder include the application information of the external content handling application, but not the user information of the second user account, denying access to the file for the external content handling application on behalf of the second user account.

3. The method of claim 1, wherein the modifying of the one or more ACLs associated with the shared folder comprises:
determining an ACL associated with the file as the one or more ACLs associated with the shared folder;
modifying the ACL associated with the file to include the user information of the first user account and the application information of the external content handling application for granting the external content handling application access to the file on behalf of the first user account;
determining another ACL associated with at least one of another file of the shared folder, the subfolder of the shared folder, or one or more files stored under the subfolder of the shared folder; and
modifying the another ACL to correspond to the modified ACL associated with the file.

4. The method of claim 3, further comprising:
receiving, by the cloud storage system, a request of the external content handling application to access a file of the one or more files stored under the subfolder of the shared folder on behalf of the first user account;
determining that the another ACL is associated with the file of the one or more files stored under the subfolder of the shared folder;
determining whether to grant or deny access to the file of the one or more files stored under the subfolder of the shared folder by the external content handling application on behalf of the first user account based on one or more user information and one or more application information included in the another ACL; and
responsive to determining that the another ACL includes the user information of the first user account and the application information of the external content handling application, allowing the external content handling application to access the file of the one or more files stored under the subfolder of the shared folder on behalf of the first user account.

5. The method of claim 1, wherein the external content handling application is executing on the user device to perform one or more operations with respect to file content, the one or more operations comprising at least one of presenting the file content, modifying the file content, deleting at least a portion of the file content, adding new content to the file content, or playing the file content.

6. The method of claim 1, wherein the receiving of the message granting access to the file further comprises verifying that the first user account has privilege to grant access to the files.

7. The method of claim 1, wherein each ACL includes an access control list entry.

8. A system comprising:
a memory; and
a processing device at a cloud storage system that stores a plurality of files for a plurality of user accounts, communicatively coupled to the memory to:
receive, at the cloud storage system, a request to access a file of the plurality of files from an external content handling application on behalf of a first user account of the plurality of user accounts, wherein the external content handling application is an application provided by an external system connected to the cloud storage system via a network;
determine, by the cloud storage system and based on one or more access control lists (ACLs) associated with a shared folder containing the file stored on the cloud storage system, that the external content handling application executing on a user device associated with the first user account is not allowed to access the file on behalf of the first user account, wherein the shared folder is accessible to a set of user accounts including the first user account and a second user account of the cloud storage system, and wherein the one or more ACLs associated with the shared folder do not specify access to files in the shared folder for the external content handling application;
receive, by the cloud storage system and from the user device associated with the first user account, a message authorizing the external content handling application to access the file on behalf of the first user account; and
responsive to the receiving of the message authorizing the external content handling application to access the file on behalf of the first user account associated with a first user:
modify, by the cloud storage system and without any further input of the first user, the one or more ACLs associated with the shared folder containing the file and a subfolder on the cloud storage system, wherein modifying the one or more ACLs associated with the shared folder comprises including user information of the first user account and application information of the external content handling application in the one or more ACLs, wherein responsive to the receiving of the message authorizing the external content handling application to access the file on behalf of the first user account, the one or more ACLs are modified for the shared folder and not for the subfolder of the shared folder; and
allow, by the cloud storage system, the external content handling application to access the file on behalf of the first user account based on the user information of the first user account and the application information of the external content handling application in the modified ACLs associated with the shared folder, wherein the modified ACLs associated with the shared folder prevent the external content handling application to access the file on behalf of the second user account.

9. The system of claim 8, wherein the processing device is further to:
  receive another request to access the file from the external content handling application on behalf of the second user account;
  determine whether to grant or deny access to the file for the external content handling application on behalf of the second user account based on one or more user information and one or more application information included in the modified ACLs associated with the shared folder, the one or more user information including (i) the user information of the first user account but not the user information of the second user account and (ii) the one or more application information including the application information of the external content handling application; and
  responsive to determining that the ACLs associated with the shared folder include the application information of the external content handling application, but not the user information of the second user account, deny access to the file for the external content handling application on behalf of the second user account.

10. The system of claim 8, wherein to modify the one or more ACLs associated with the shared folder, the processing device is to:
  determine an ACL associated with the file as the one or more ACLs associated with the shared folder;
  modify the ACL associated with the file to include the user information of the first user account and the application information of the external content handling application for granting the external content handling application access to the file on behalf of the first user account;
  determine another ACL associated with at least one of another file of the shared folder, the subfolder of the shared folder, or one or more files stored under the subfolder of the shared folder; and
  modify the another ACL to correspond to the modified ACL associated with the file.

11. The system of claim 10, wherein the processing device is further to:
  receive a request of the external content handling application to access a file of the one or more files stored under the subfolder of the shared folder on behalf of the first user account;
  determine that the another ACL is associated with the file of the one or more files stored under the subfolder of the shared folder;
  determine whether to grant or deny access to the file of the one or more files stored under the subfolder of the shared folder by the external content handling application on behalf of the first user account based on one or more user information and one or more application information included in the another ACL; and
  responsive to determining that the another ACL includes the user information of the first user account and the application information of the external content handling application, allow the external content handling application to access the file of the one or more files stored under the subfolder of the shared folder on behalf of the first user account.

12. The system of claim 8, wherein the external content handling application is executing on the user device to perform one or more operations with respect to file content, the one or more operations comprising at least one of presenting the file content, modifying the file content, deleting at least a portion of the file content, adding new content to the file content, or playing the file content.

13. The system of claim 8, wherein to receive the message granting access to the file, the processing device is further to verify that the first user account has privilege to grant access to the files.

14. The system of claim 8, wherein each ACL includes an access control list entry.

15. A non-transitory computer-readable storage medium comprising executable instructions that when executed, by a processing device at a cloud storage system that stores a plurality of files for a plurality of user accounts, cause the processing device to:
  receive, at the cloud storage system, a request to access a file of the plurality of files from an external content handling application on behalf of a first user account of the plurality of user accounts, wherein the external content handling application is an application provided by an external system connected to the cloud storage system via a network;
  determine, by the cloud storage system and based on one or more access control lists (ACLs) associated with a shared folder containing the file stored on the cloud storage system, that the external content handling application executing on a user device associated with the first user account is not allowed to access the file on behalf of the first user account, wherein the shared folder is accessible to a set of user accounts including the first user account and a second user account of the cloud storage system, and wherein the one or more ACLs associated with the shared folder do not specify access to files in the shared folder for the external content handling application;
  receive, by the cloud storage system and from the user device associated with the first user account, a message authorizing the external content handling application to access the file on behalf of the first user account; and
  responsive to the receiving of the message authorizing the external content handling application to access the file on behalf of the first user account associated with a first user:
    modify, by the cloud storage system and without any further input of the first user, the one or more ACLs associated with the shared folder containing the file and a subfolder on the cloud storage system, wherein modifying the one or more ACLs associated with the shared folder comprises including user information of the first user account and application information of the external content handling application in the one or more ACLs, wherein responsive to the receiving of the message authorizing the external content handling application to access the file on behalf of the first user account, the one or more ACLs are modified for the shared folder and not for the subfolder of the shared folder; and
    allow, by the cloud storage system, the external content handling application to access the file on behalf of the first user account based on the user information of the first user account and the application information of the external content handling application in the modified ACLs associated with the shared folder, wherein the modified ACLs associated with the shared folder prevent the external content handling application to access the file on behalf of the second user account.

16. The non-transitory computer-readable storage medium of claim 15, wherein the processing device is further to:
- receive another request to access the file from the external content handling application on behalf of the second user account;
- determine whether to grant or deny access to the file for the external content handling application on behalf of the second user account based on one or more user information and one or more application information included in the modified ACLs associated with the shared folder, the one or more user information including (i) the user information of the first user account but not the user information of the second user account and (ii) the one or more application information including the application information of the external content handling application; and
- responsive to determining that the ACLs associated with the shared folder include the application information of the external content handling application, but not the user information of the second user account, deny access to the file for the external content handling application on behalf of the second user account.

17. The non-transitory computer-readable storage medium of claim 15, wherein to modify the one or more ACLs associated with the shared folder, the processing device is to:
- determine an ACL associated with the file as the one or more ACLs associated with the shared folder;
- modify the ACL associated with the file to include the user information of the first user account and the application information of the external content handling application for granting the external content handling application access to the file on behalf of the first user account;
- determine another ACL associated with at least one of another file of the shared folder, the subfolder of the shared folder, or one or more files stored under the subfolder of the shared folder; and
- modify the another ACL to correspond to the modified ACL associated with the file.

18. The non-transitory computer-readable storage medium of claim 17, wherein the processing device is further to:
- receive a request of the external content handling application to access a file of the one or more files stored under the subfolder of the shared folder on behalf of the first user account;
- determine that the another ACL is associated with the file of the one or more files stored under the subfolder of the shared folder;
- determine whether to grant or deny access to the file of the one or more files stored under the subfolder of the shared folder by the external content handling application on behalf of the first user account based on one or more user information and one or more application information included in the another ACL; and
- responsive to determining that the another ACL includes the user information of the first user account and the application information of the external content handling application, allow the external content handling application to access the file of the one or more files stored under the subfolder of the shared folder on behalf of the first user account.

19. The non-transitory computer-readable storage medium of claim 15, wherein the external content handling application is executing on the user device to perform one or more operations with respect to file content, the one or more operations comprising at least one of presenting the file content, modifying the file content, deleting at least a portion of the file content, adding new content to the file content, or playing the file content.

20. The non-transitory computer-readable storage medium of claim 15, wherein to receive the message granting access to the file, the processing device is further to verify that the first user account has privilege to grant access to the files.

* * * * *